Nov. 3, 1953 G. B. HILL ET AL 2,657,518
SIDE DELIVERY RAKE
Filed Sept. 30, 1950 7 Sheets-Sheet 5
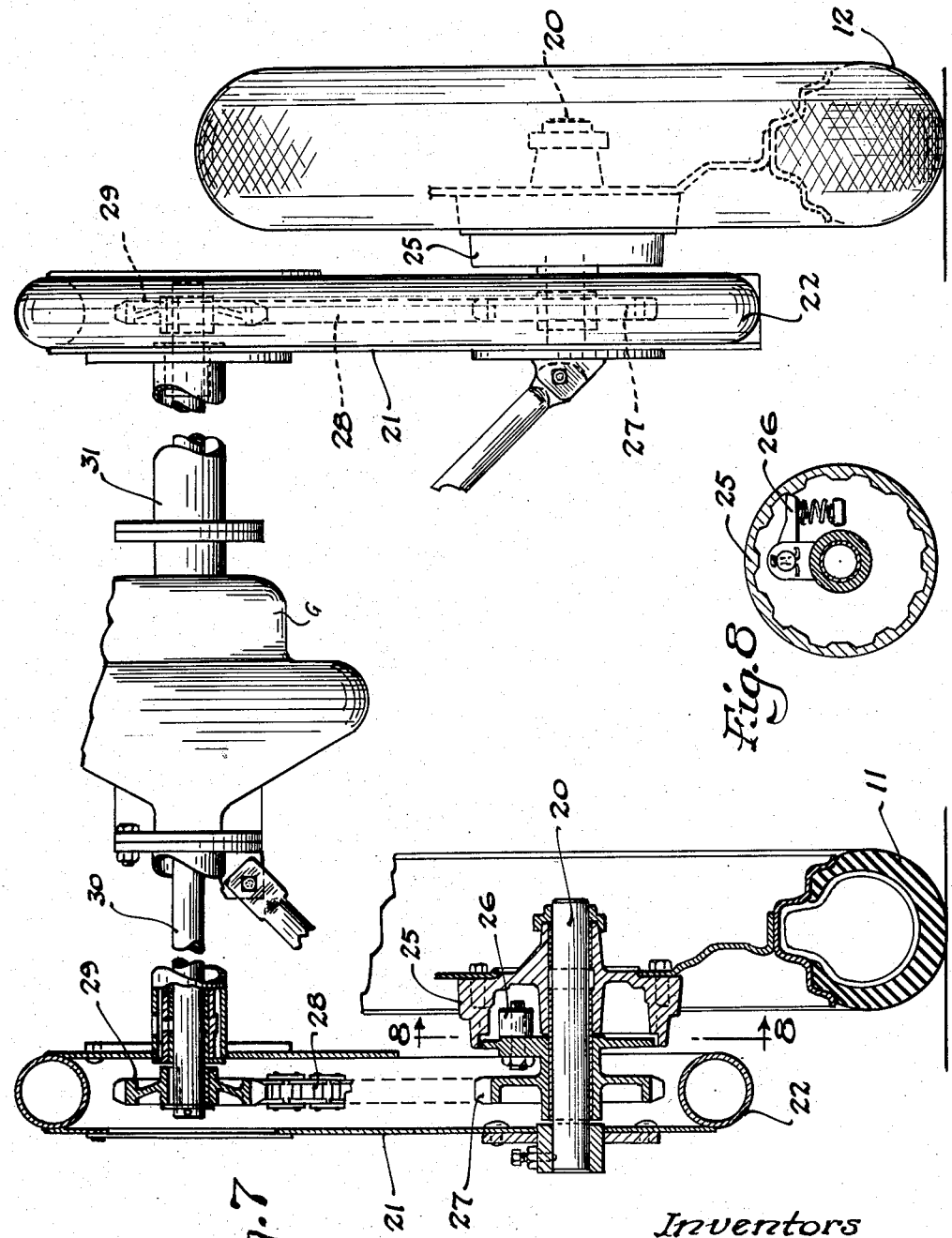
Inventors
George B. Hill
Donald L. King
By Allan R. Redrow
Attorney

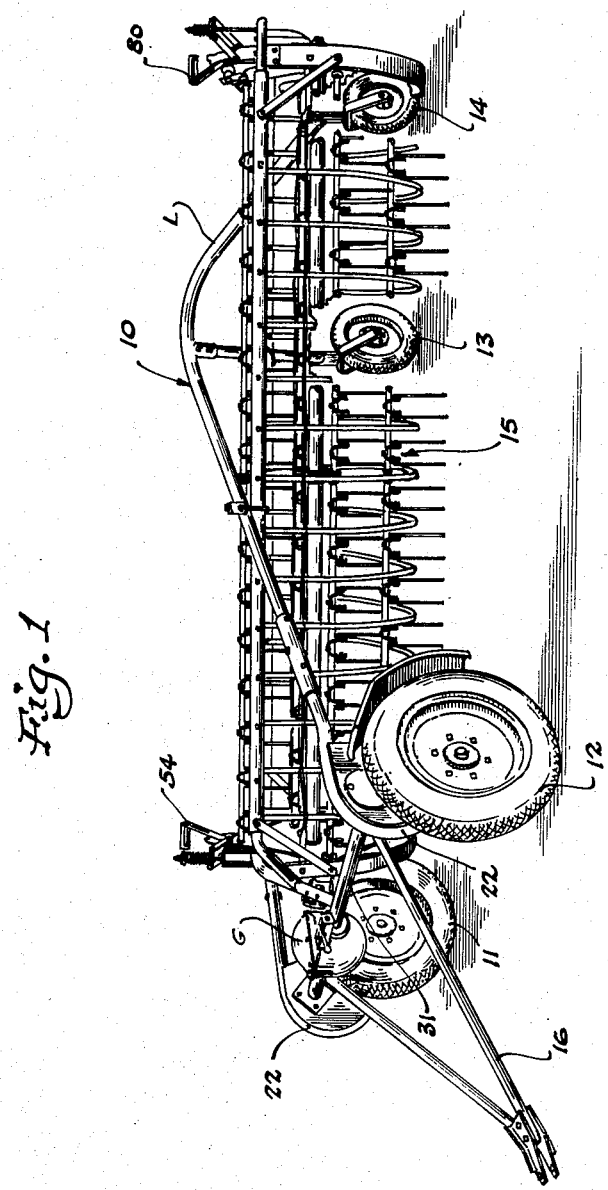

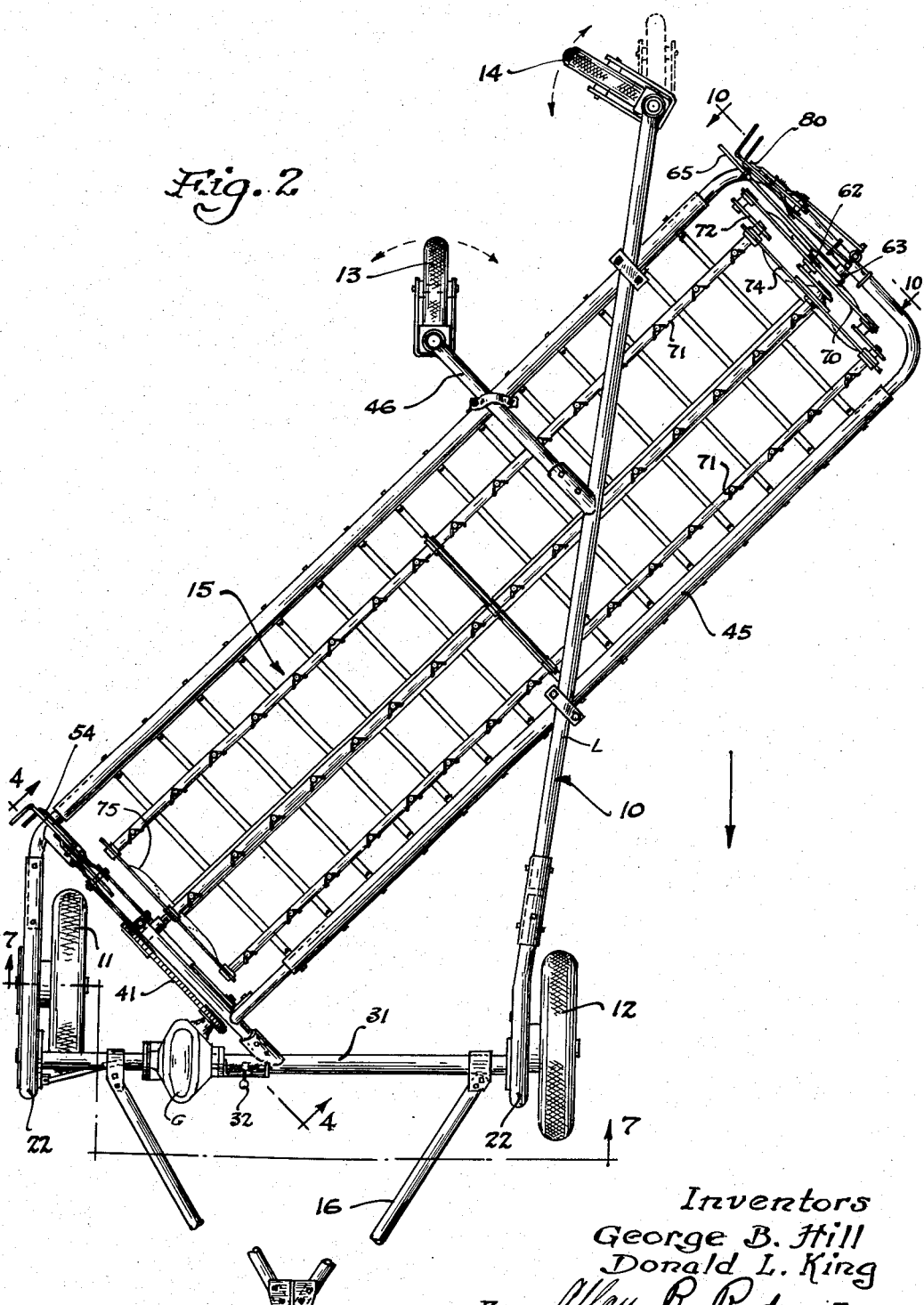

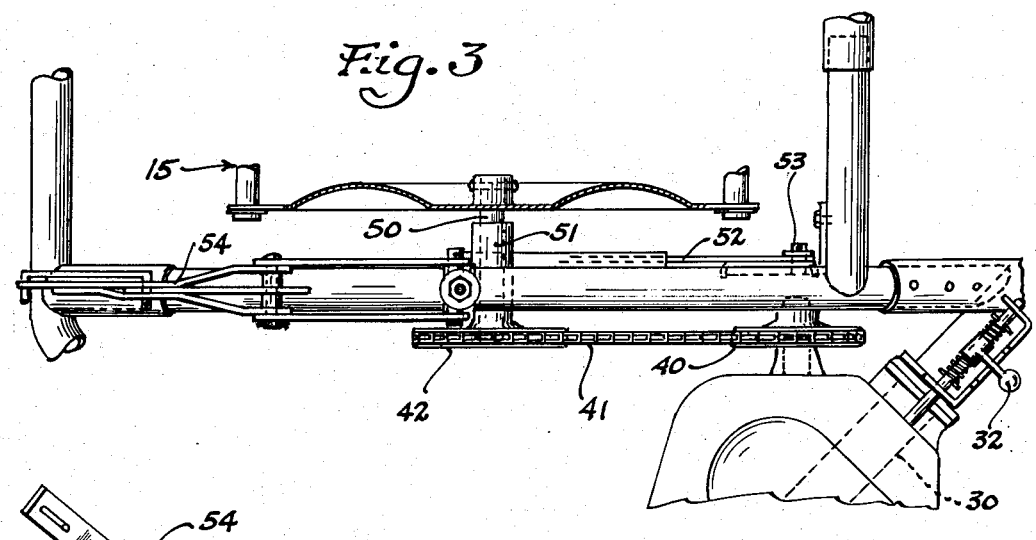
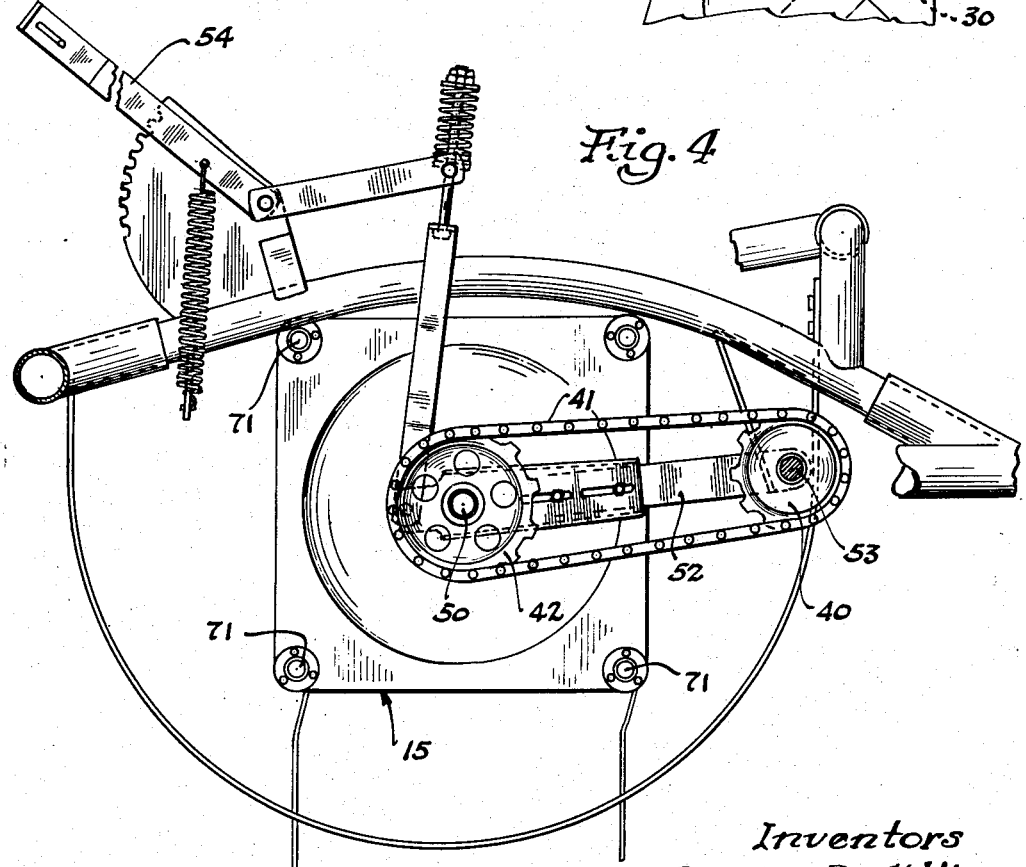

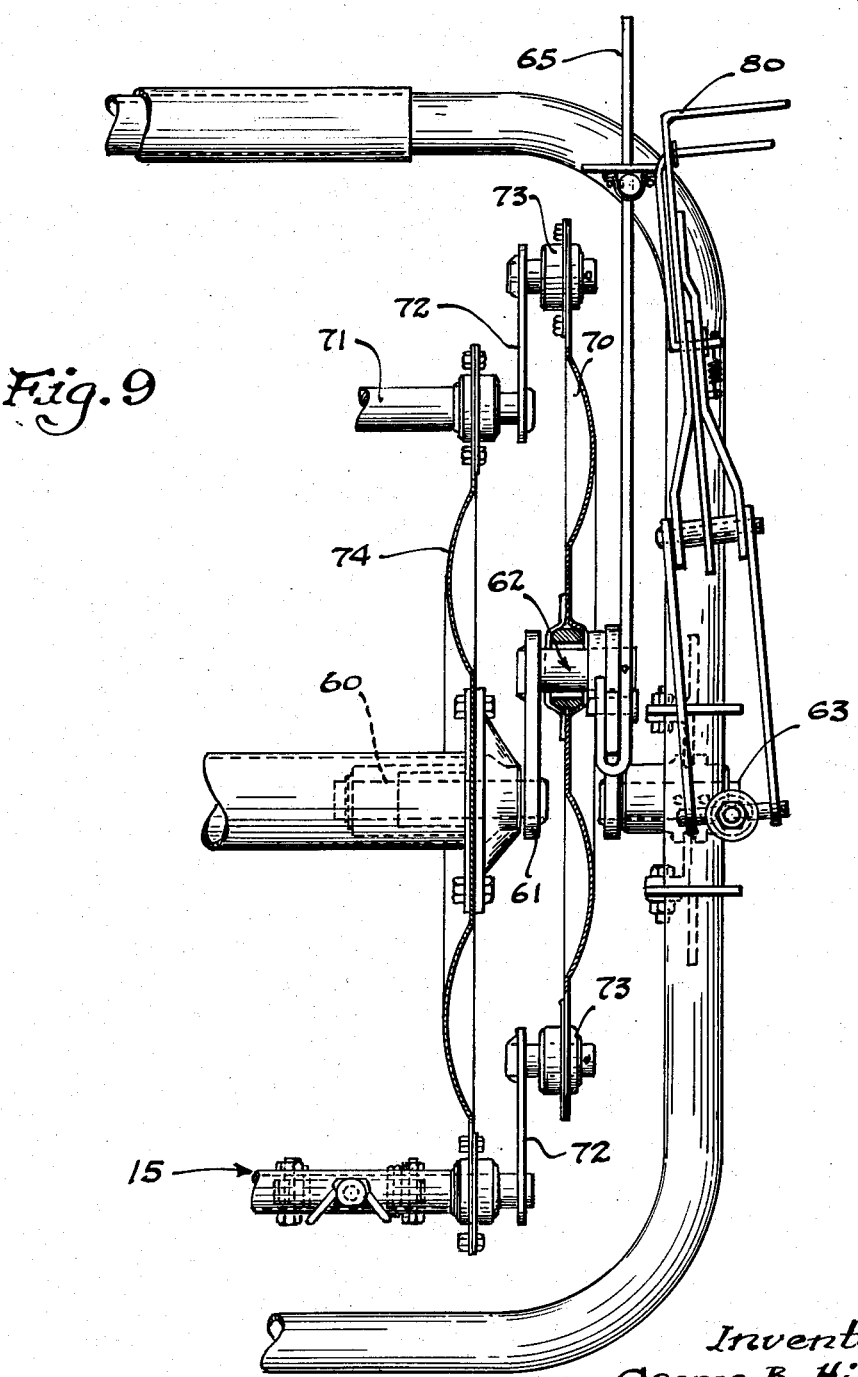

Nov. 3, 1953

G. B. HILL ET AL 2,657,518

SIDE DELIVERY RAKE

Filed Sept. 30, 1950

Inventors
George B. Hill
Donald L. King
By Allan R. Redrow
Attorney

Patented Nov. 3, 1953

2,657,518

UNITED STATES PATENT OFFICE 2,657,518

SIDE DELIVERY RAKE

George B. Hill, New Holland, and Donald L. King, Leola, Pa., assignors to New Holland Machine Division of The Sperry Corporation, New Holland, Pa., a corporation of Delaware Application September 30, 1950, Serial No. 187,702

4 Claims. (Cl. 56—377)

This invention relates to side delivery rakes, and more particularly to an improved side rake having ground drive means for rotating the raking reel.

The principal features of this invention are concerned with improvements in the construction of the frame, disposition of the wheels with respect to the rotating reel, and a simplified pitch control means for the rake teeth carried by the reel member of the rake. The frame is made up of parts which may be bolted together so that the frame can be shipped in a knocked down condition and quickly assembled into a rigid tubular structure for supporting the rotating reel. The elements of the frame have been designed to be most compact when arranged for shipment and the frame includes triangular cross bracing elements to stiffen it when assembled for use. Improved enclosed drive means are provided for transmitting motion from the wheels to the raking reel, and the drive system is substantially wholly enclosed in the wheel supporting structure.

The front wheels are mounted in an offset relation such that one wheel is positioned closely adjacent to the front end of the obliquely disposed rotating reel, while the other front wheel is positioned somewhat forwardly of said one wheel and approximately in front of the center of the raking reel. The rear end of the frame is supported on a pair of castering wheels one of which is disposed near the rear end of the rotating raking reel, while the other is positioned to follow behind the rake in a path between the tracks of the two forward wheels.

In addition to the enclosed drive and wheel mounting improvements, the raking reel has a simplified pitch control mechanism associated therewith to control the angle at which the raking teeth are driven against the ground for either raking or tedding a crop. The improved design as will appear more fully below, makes it possible to use standardized parts and provides a lighter, more compact pitch control means.

The preferred form of the invention is shown in the drawings wherein:

Figure 1 is a front perspective view looking into the raking reel, the basket being partly broken away to show the rear castering wheels;

Figure 2 is a top plan view;

Figure 3 is an enlarged top plan view of a portion of the structure showing the drive connection to the rotating raking reel;

Figure 4 is an end view of the drive end of the raking reel taken on line 4—4 of Figure 2;

Figure 7 is a view taken on line 7—7, as shown in Figures 2 and 6;

Figure 8 is a view taken on line 8—8 of Figure 7;

Figure 9 is a top plan view of the pitch control mechanism the uppermost rake bar and portions of its supporting spider and of the plate 70 being removed to permit a clear view of the mechanism therebeneath.

Figure 5:
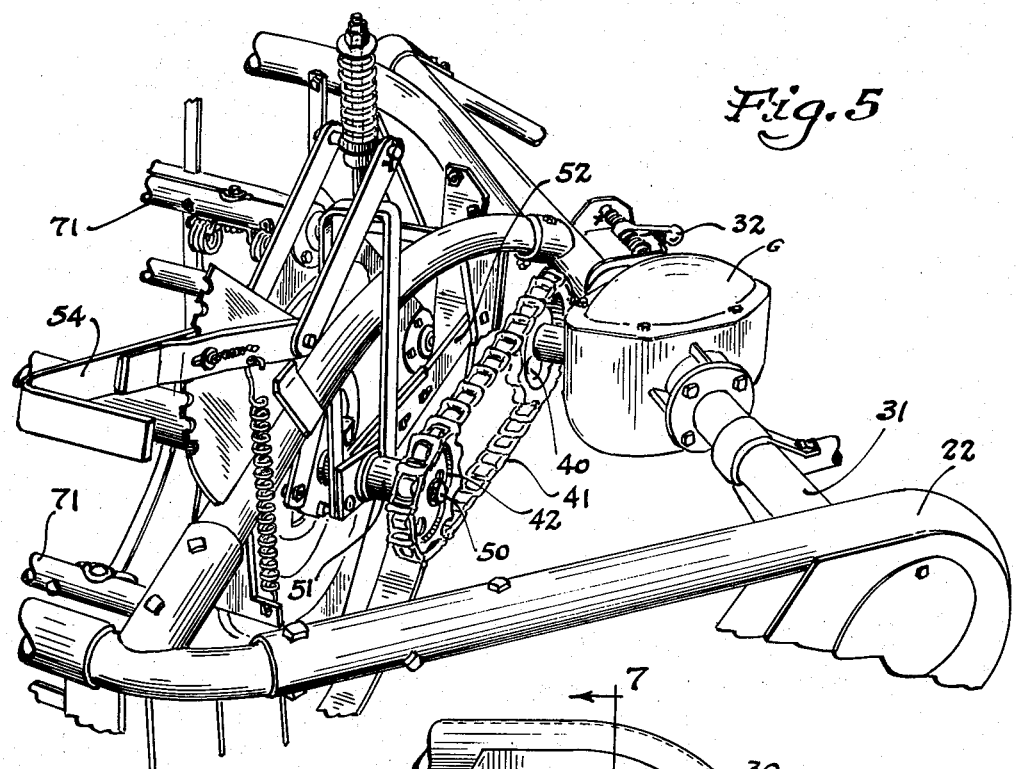
Figure 5 is a perspective view showing the drive end of the rotating raking reel.
Figure 6:
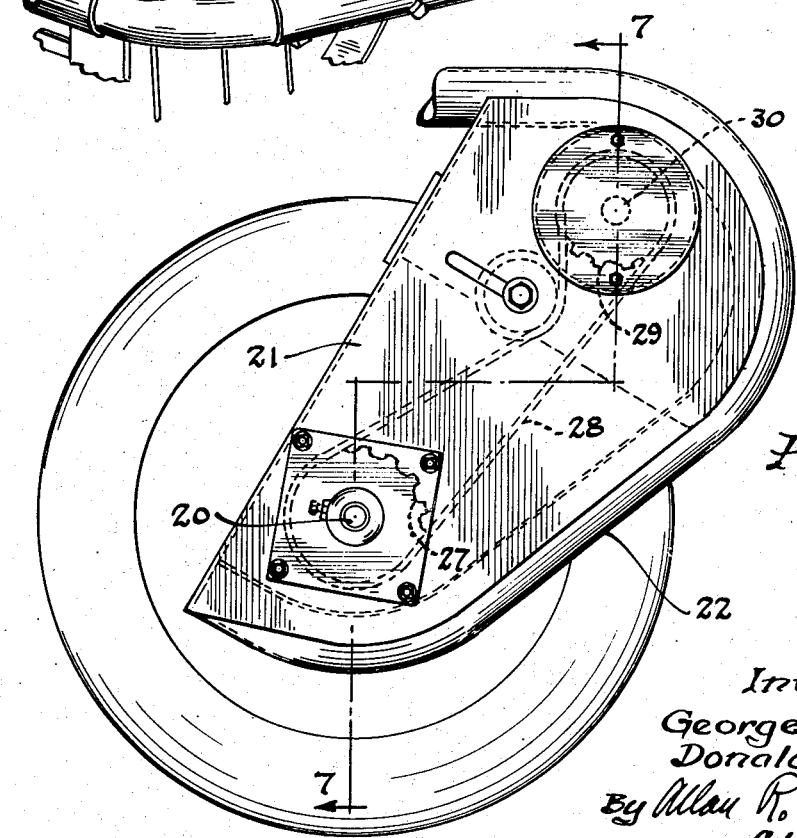
Figure 6 is a side elevation of one of the wheel mounting structures.
Figure 10:
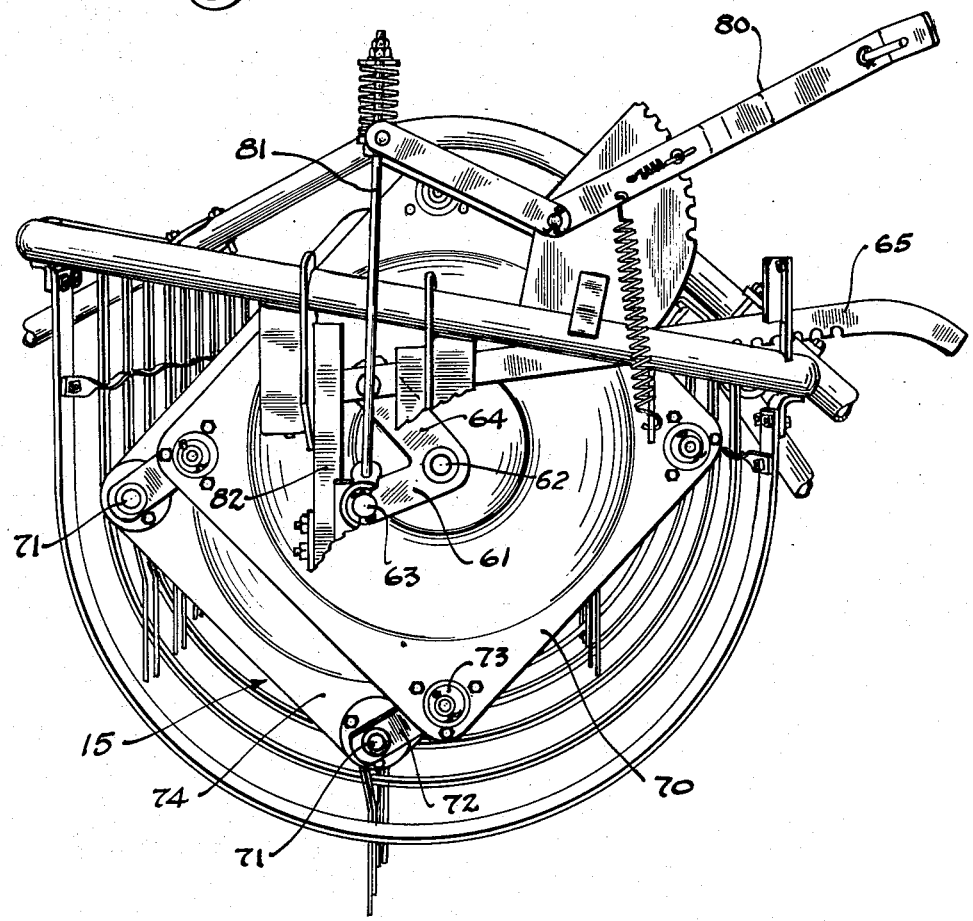
Figure 10 is an end elevation of the pitch control mechanism for the raking reel.

The raking structure of this invention is mounted on a wheel supported frame 10 having front wheels 11 and 12 fixedly mounted thereon, the rear of the frame being supported on castering wheels 13 and 14. The frame supports a rotating raking reel 15 having suitable raking teeth carried on the raking bars of the reel in a manner to be driven against the ground to windrow hay or the like as is conventional in connection with side delivery rakes. The frame 10 is adapted to be towed behind a tractor by means of the hitch 16 which is pivotally connected to the front end of the frame.

The front wheels 11 and 12 are fixedly carried on the front end of the frame by being mounted on stub axles 20, which in turn, are supported from the plates 21 that are welded tangent to the outside portions of the downwardly projecting side leg elements 22 that are integrally formed on frame 10. Referring to Figure 2, it will be seen that the wheel 11 is positioned closely adjacent the front end of raking reel 15 and is mounted on the inside of the bar element 22 for a purpose that will appear more fully below. The wheel 12 is carried on frame 10 approximately in front of the center of the rotating raking reel 15, and as is clearly shown in Figure 2, is displaced forwardly with respect to the axis of the stub axle about which wheel 11 rotates. The wheels 11 and 12 each have a hollow hub member 25 that is provided with ratchet teeth on its inside periphery as is best shown in Figure 8, which drive their respective pawls 26 connected to the hub of sprocket wheel 27. Each of the sprocket wheels 27 cooperates with a sprocket chain 28 to drive sprocket wheels 29 keyed to the axle 30. The axle 30 is enclosed by the tubular cross bar 31 forming an arch between the two leg portions 22 of the frame and axle 30 is connected through a suitable reversible gear drive means housed in gear box G which is operative under the control of a gear shift lever 32 to deliver the power for rotating the reel. The output of the gear box G drives sprocket 40 and chain 41 to transmit rotating motion to the reel 15.

Referring to Figure 2, it will be noted that the frame 10 is made up of rigid preferably tubular elements forming a basket member 45 which supports the rotating reel and the basket is hung from the underside of a longitudinal member L extending from the front wheels back to the rear castering wheels with a cross bar 46 to support the forwardmost of the rear caster wheels. The forward end of the basket 45 forms one leg of a triangle which is completed by the member 31 and leg 22 supporting wheel 11 so that as the frame is assembled a rigid triangular section is produced which serves to make the tubular frame quite rigid and sturdy. Other triangular stiffening constructions are formed on the frame element which occupy different planes so that the frame is braced in several directions to provide rigidity. It may be noted in passing that the several pieces of the frame forming the basket, the longitudinal members, and wheel mounting elements are all bolted together through suitable male and female connections so that the elements of the structure may be arranged in a compact space for shipment and yet may be easily and quickly assembled.

The rotating reel 15 comprises raking bars 71 supported between spiders 74 and 75 carried on an axle 50 which at its forward end has sprocket 42 keyed thereto and this end of the axle is supported in a bearing 51 integral with the free end of a radius arm 52 which is mounted to oscillate about bearing 53 carried on the frame of the machine. The free end of the radius arm 52 may be adjusted vertically by means of lever 54 so that the raking reel 15 can be raised or lowered with respect to the ground to bring the raking teeth into contact with the crop to be raked as the reel rotates or to lift the reel as the rake is being transported to or from the field being worked upon.

The opposite end of the reel is supported in a bearing 60 carried at the end of the crank arm 61 of a crank shaft 62 that is mounted in a bearing 63 to be oscillated with respect to the frame.

The crank shaft 62 has an upwardly extending arm 64 fixed thereto which cooperates with an adjusting lever 65 which may be pushed in or pulled out with respect to the basket portion of the frame to oscillate the crank shaft 62 about its bearing 63.

A pitch control plate 70 is rotatably carried on the crank pin bearing of crank shaft 62 and each of the raking bars 71 of the reel are connected at their respective outer ends with cranks 72 that are rotatably supported at their other ends in bearings 73 carried by the pitch control plate 70. With this construction, it is seen that as the crank shaft 62 is adjusted by means of the lever 65, the position of the pitch control plate 70 is changed with respect to the spider plate 74 in which the raking bars 71 of the reel are carried and when the relative eccentricity of these two plates 70 and 74 is changed, the angle of the raking teeth with respect to the ground is changed. This pitch adjusting means is provided so that the working angle of the teeth may be varied as needed for raking different crops or for tedding a cut crop if it is desired to turn it over for further curing. During normal operation of the rake, and when the reel is rotatably driven, the cranks 72 drag the pitch control plate 70 around with the reel so that due to the coaction between the cranks and the eccentric plates 70 and 74, all of the rake bars 71 are rotated in unison and the raking teeth are held projected at the same uniform angle.

The pitch control end of the raking bar may be raised or lowered by manipulation of lever 80, which is connected through the depending link 81 with bearing 63 so that the bearing may be moved in the slideway 82.

The operation of the machine here shown is similar to that of the conventional side delivery rakes, and after it has been hitched up to a tractor, it may be towed through a field to windrow hay or ted such a crop if further curing is required. The reel may be first adjusted to a proper height with respect to the ground by adjustment of levers 54 and 80, and then the pitch of the teeth with respect to the soil may be set by adjusting lever 65 to oscillate the pitch control plate 70 with respect to spider plate 74 of the reel. When these adjustments have been made, the rake may be towed through the field whereby the front wheels 11 and 12 are rotated and are operative to supply the power required to rotate the reel. The power is transmitted through the ratchet mechanism built into their hubs to the gear means to drive the raking reel. The reel is rotated rapidly and if a windrow is being formed, the hay is collected in front of the stripper bars of the basket and moves down the face of the obliquely disposed basket as the reel rotates therein. It will be noted that the front wheel 12 is offset forwardly in front of the basket a sufficient distance to permit all of the hay crop that is rolled up in front of the basket to easily pass between the wheel and the basket so that the raking operation may proceed.

Another important feature of this invention is concerned with the mounting of the other front wheel 11 on the inside of the forwardly extending side leg element or member 22 of the frame element and immediately in front of the basket so that as the rake is towed down the field, it may follow closely along the edge of a swath that has been just mowed whereby to pick up all of the freshly cut hay. The rake may be pulled through the field so that the raking reel may cover the entire swath that has been mowed without having any of the support wheels ride outside of the swath to push down or otherwise damage hay which has not yet been mowed.

The castering wheels are disposed in such position with respect to the front wheels that the frame is given ample support to carry the basket element of the rake over depressions, holes, and the like, that are sometimes encountered in normal side delivery rake operations. The rear wheel 14 is carried closely adjacent to the rear end of the basket to support this portion of the frame and the wheel 13 is disposed to move along a path falling between the track of wheels 11 and 12 so that additional support is given to the frame and the disposition of all the wheels provides a cooperating arrangement that minimizes the possibility of the rake dropping in holes or gulleys.

The frame structure here shown is of particular advantage in handling heavy crops of hay and may be quite successfully used to rake several windrows together as is sometimes done to speed up the subsequent baling operation. Referring to Figure 7, it will be seen that the two front wheels 11 and 12 are connected by the relatively high arch member 31 fixed across the tops of the two legs 22, so that a large volume of hay material may be passed to the raking reel to complete the formation of a windrow. This ability to handle large volumes of hay with a relatively light weight rake structure is inherent in the present structure because of the structural triangular stiffening features built into the tubular frame element. This stiffness in combination with the simple leg structure including the downwardly projecting side leg elements 22 and the welded side plates 21, produces a rigid structure having a high arched front end drive support means through which the hay may be readily moved.

In addition to functioning as a support for the stub axles for the front wheels, the side stiffening plates 21 also in cooperation with the wheels 11 and 12, provide a housing for fully enclosing the rake reel drive system. Hay and other debris thus cannot become trapped in the sprocket drive and further, the sprockets are concealed which adds to the safety of operation and trim appearance of the machine.

As above stated, the embodiment of the invention shown herein is the preferred form and it is apparent that many modifications of the above described structure may occur to those skilled in the art, which may fall within the scope of the following claims.

We claim:

1. A substantially rigid tubular frame for supporting the rotating reel of a side delivery rake, the reel being mounted obliquely across the frame with respect to the normal direction of movement of the rake, a hitch for trailing the rake behind a tractor, said frame comprising a relatively high arch member integral with the front end and disposed crosswise of the frame, said arch including downwardly projecting side leg elements, tubular elements of said frame being bent back partially upon themselves in a substantially vertical plane to define said legs, side plates mounted integrally over said bent tubular sections to complete said leg structures, stub axles fixed to the side plates at the lower ends of each of said leg elements, front support wheels for said frame carried on said stub axles, and castering wheel means for supporting the rear of the frame.

2. A substantially rigid tubular frame for supporting the rotating reel of a side delivery rake, the reel being mounted obliquely across the frame with respect to the normal direction of movement of the rake, a hitch for trailing the rake behind a tractor, said frame comprising a relatively high arch member integral with the front end and disposed crosswise of the frame, said arch including downwardly projecting side leg elements, tubular elements of said frame being bent back partially upon themselves in a substantially vertical plane to define said legs, side plates mounted integrally over said bent tubular sections to complete said leg structures, stub axles fixed to the side plates to extend inwardly past the lower ends of each of said leg elements, front support wheels for said frame carried on said stub axles, a sprocket drive system for rotating the reel, said drive including a sprocket wheel driven from at least one of said support wheels and a sprocket chain cooperating therewith and confined within the corresponding bent leg section and its associated plate, and castering wheel means for supporting the rear of the frame.

3. A substantially rigid frame made from barlike elements for supporting the rotating reel of a side delivery rake, the reel being mounted obliquely across the frame with respect to the normal direction of movement of the rake, a hitch for trailing the rake behind a tractor, said frame comprising a relatively high arch member integral with the front end and disposed crosswise of the frame, said arch including downwardly projecting side leg elements, certain of the barlike elements of said frame being bent back partially upon themselves in a substantially vertical plane to define said legs, side plates mounted integrally over the sides of said bent bar-like elements to complete said leg structures, stub axles fixed to the side plates to extend from said plates past the lower ends of each of said leg elements, front support wheels for said frame carried on said stub axles, a sprocket drive system for rotating the reel, said system including sprocket wheels on each of said support wheels and a sprocket chain cooperating therewith and confined within its corresponding bent leg section and its associated plate, and castering wheel means for supporting the rear of the frame.

4. A substantially rigid tubular frame for supporting the rotating reel of a side delivery rake, the reel being mounted obliquely across the frame with respect to the normal direction of movement of the rake, a hitch for trailing the rake behind a tractor, said frame comprising a relatively high arch member integral with the front end and disposed crosswise of the frame, said arch including downwardly projecting side leg elements, tubular elements of said frame being bent back partially upon themselves in a substantially vertical plane to define said legs, side plates mounted integrally over said bent tubular sections to complete said leg structures, one of said legs terminating adjacent the forwardmost end of said reel, the other of said legs being disposed approximately in the front of the center point of said reel, stub axles fixed to the side plates at the lower ends of each of said leg elements, the axle fixed to said one leg being mounted to face inwardly toward said forwardmost end of the reel, the axle fixed to said other leg being spaced relatively forwardly of said inwardly facing axle, front support wheels for said frame carried on said stub axles, and castering wheel means for supporting the rear of the frame.

GEORGE B. HILL.
DONALD L. KING.

References Cited in the file of this patent

UNITED STATES PATENTS

| Number | Name | Date |
| --- | --- | --- |
| 2,162,506 | Jones et al. | June 13, 1939 |
| 2,336,117 | Moschel et al. | Dec. 7, 1943 |
| 2,497,729 | Heth et al. | Feb. 14, 1950 |
| 2,505,704 | Boroman | Apr. 25, 1950 |
| 2,511,894 | Altget et al. | June 20, 1950 |
| 2,514,561 | Scranton | July 11, 1950 |
| 2,518,389 | Sisulak | Aug. 8, 1950 |
| 2,566,724 | Heil | Sept. 4, 1951 |
| 2,595,788 | Hill | May 6, 1952 |

FOREIGN PATENTS

| Number | Country | Date |
| --- | --- | --- |
| 690,870 | Germany | May 9, 1940 |